United States Patent [19]

Cosh

[11] 4,112,784

[45] Sep. 12, 1978

[54] APPARATUS FOR PRODUCING MOTION OF A WORKPIECE

[76] Inventor: Harry Jose Cosh, 33 Wallace St., Bairnsdale Victoria, Australia

[21] Appl. No.: 701,419

[22] Filed: Jun. 30, 1976

[30] Foreign Application Priority Data

Jul. 4, 1975 [AU] Australia .............................. 2230/75

[51] Int. Cl.² .............................................. F16C 1/22
[52] U.S. Cl. ................................................ 74/501.5 R
[58] Field of Search ...................... 74/501 R, 501.5 R; 240/61.4, 61.8, 61.13; 362/233, 425

[56] References Cited

U.S. PATENT DOCUMENTS

| | | | |
|---|---|---|---|
| 3,625,597 | 12/1971 | Jones | 74/501 M |
| 3,712,149 | 1/1973 | Van Noord | 74/501 M |

*Primary Examiner*—Stephen C. Bentley
*Attorney, Agent, or Firm*—Lowe, King, Price & Becker

[57] ABSTRACT

There is disclosed a drive apparatus for producing motion of a workpiece such as adjustment of a rear view mirror, comprising two drums arranged with their axis of rotations being relatively offset, the two drums being individually rotatable by means of a single controller in that the controller is attached to each drum such that it is off-center in only one of the vertical and horizontal directions, each drum controlling either vertical or horizontal motion of the workpiece. Also disclosed is a mirror head adapted for remote control and a compensator for Bowden cables comprising a hollow block adapted to receive and retain an outer cable of at least one Bowden cable, the block being mounted with a housing having an interior wall, shaft means passing through the block and acting on the interior wall, a first compression spring mounted on the shaft inside the block, a retaining device for holding the spring against axial movement relative to the block to allow for excessive cable tension, and a primary adjusting means for adjustment of primary cable tensions.

6 Claims, 33 Drawing Figures

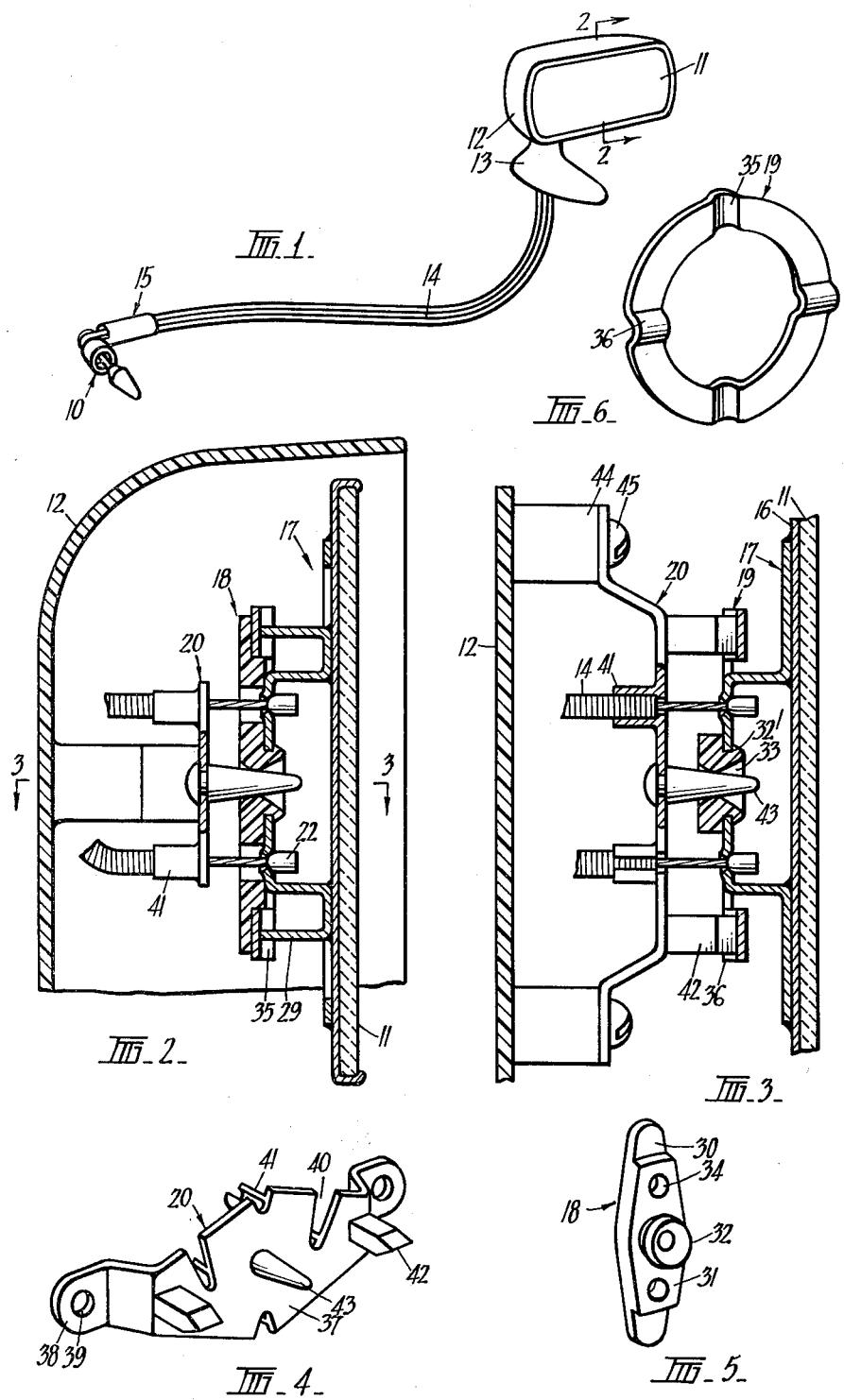

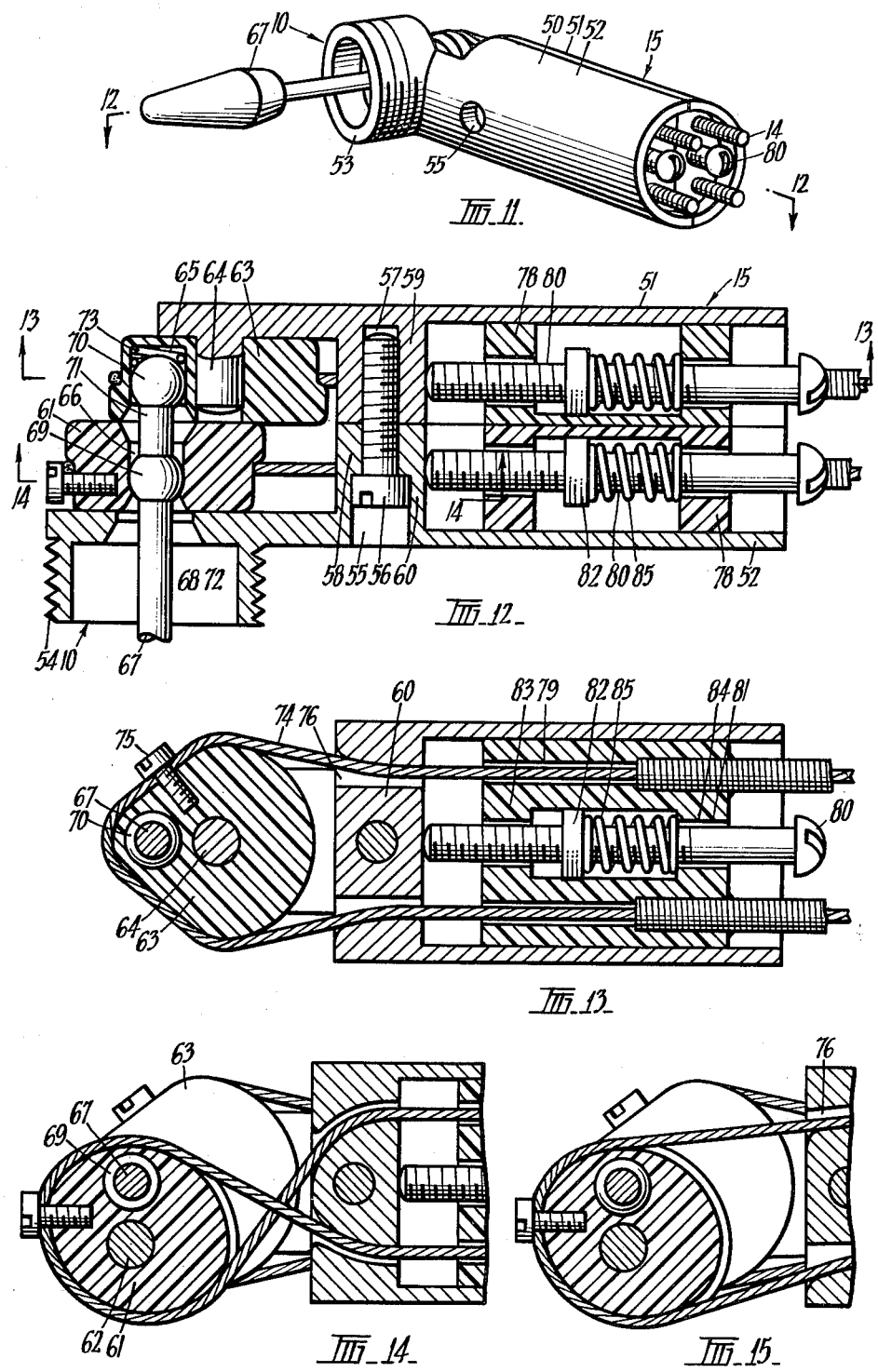

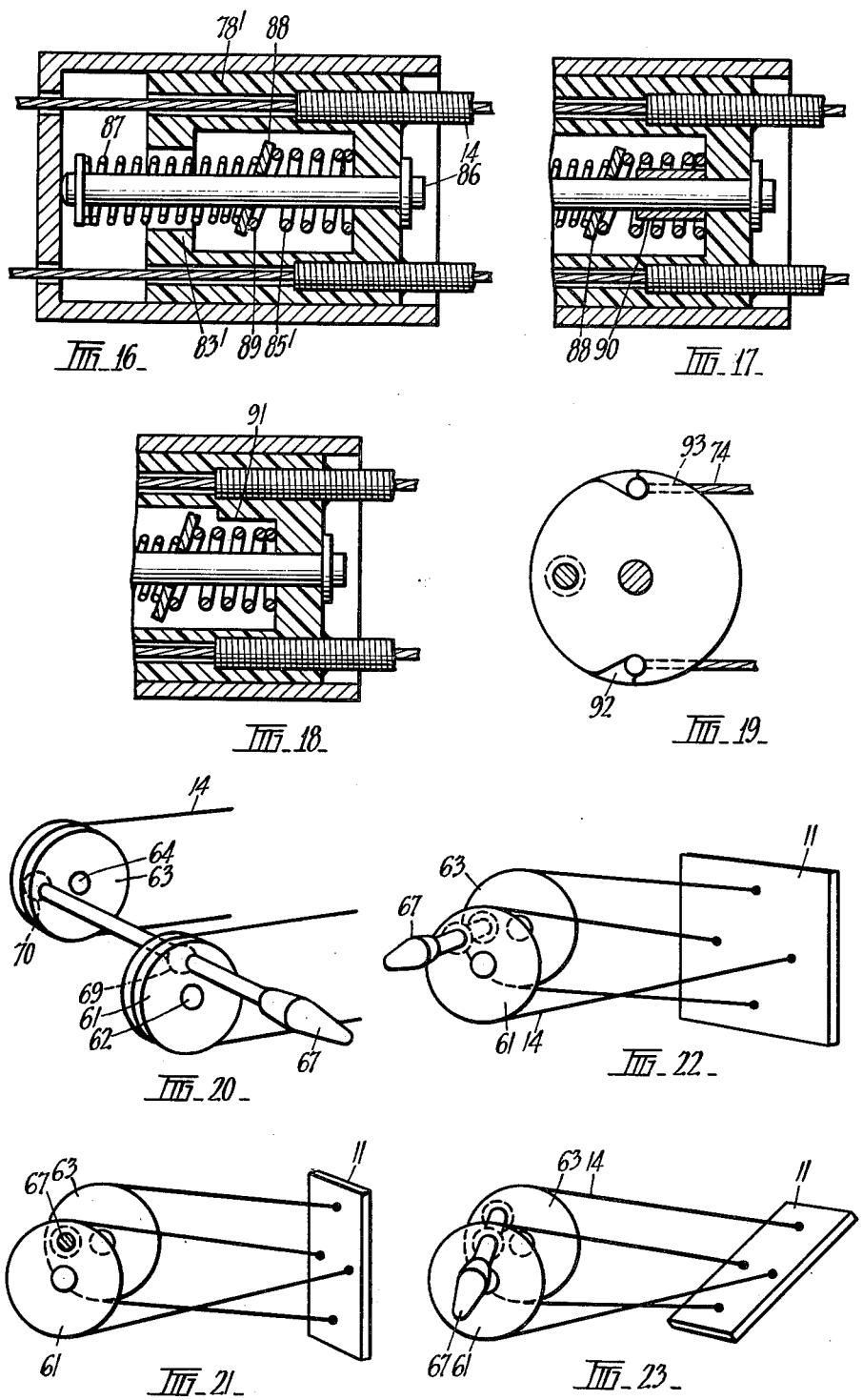

APPARATUS FOR PRODUCING MOTION OF A WORKPIECE

This invention relates to improvements in apparatus for producing motion of a workpiece and refers particularly, though not exclusively, to such apparatus for providing adjustment of rear vision mirror of an automobile.

There have been many designs proposed for the remote control of exterior-mounted rear vision mirrors of automobiles. Most of these designs have suffered from complexity of construction, inefficiency in operation, large forces required to operate, difficulty in accurately locating the mirror, and many others.

As example of such prior art is the mirror and driver shown in U.S. Pat. No. 2,931,245 of Jacobson. This patent shows a rear-vision mirror for automobiles which is driven remotely by cables from a drive unit. This particular apparatus has been found defective in practice because of problems associated with the bending of the drive cables and with the smoothness of the operation. If the cables of the Jacobson device were severely bent then the operation of the drive lever will not cause movement of the mirror. This is because the spring provided in the drive unit is purely for the absorbtion of basic cable tension variations due to cable stretched and differing cable lengths.

Furthermore, the Jacobson mirror has proven to have lack of smoothness in operation and lack of finess in the definite locating of the mirror in a required position.

The Jacobson mirror has also suffered from large movements due to the normal vibrations associated with a moving automobile.

It is therefore the principal object of the present invention to provide apparatus for producing motion of a workpiece having more positive control of the location and angle of the workpiece in the vertical and horizontal planes.

A further object is to provide a stable yet more easily assembled and disassembled construction.

Another object is to provide compensation for various factors influencing the operation of the apparatus.

With these and other objects in mind, the present invention provides drive apparatus for producing motion of a workpiece comprising two drums arranged with their axis of rotations being relatively offset, the two drums being individually rotatable by means of a single controller in that the controller is attached to each drum such that it is off-centre in only one of the vertical and horizontal directions, each drum controlling either vertical or horizontal motion of the workpiece.

The invention also provides a mirror head adapted for remote control comprising a mirror adapted to be mounted on a backing plate having a first pair of diametrally opposed vertical pivot pins arranged on its vertical transverse axis and being equidistant from the centre of the backing plate, a nipple lock coaxially mounted on said backing plate, an annular antirotation disc coaxially mounted with respect to said nipple lock, a cable end block having a pair of diametrally opposed horizontal pivot pins arranged on its horizontal transverse axis and being equidistant from the centre of the cable end block, the horizontal pivot pins and the vertical pivot pins fitting in corresponding recesses in the antirotation disc; the nipple lock being arranged to receive the ends of the driving cable means.

Such a mirror head is an improvement over and a modification of the mirror head shown in U.S. Pat. No. 3,576,359 of Cosh (the inventor of the present invention).

The patent field is crowded with many other attempts to overcome the problems described above. To illustrate this the following table gives many U.S. Patents relating to such mirrors, many of which could never work properly:

| Number | Date | Name |
| --- | --- | --- |
| Re 27172 | 20th September 1971 | Van Nord |
| 3712149 | 23rd January 1973 | Van Nord |
| 3653276 | 4th April 1972 | McIntyre |
| 3625085 | 7th December 1971 | Shrode |
| 3618420 | 9th November 1971 | Horwitt |
| 3561283 | 9th February 1971 | Smith |
| 3552229 | 5th January 1971 | Cummins |
| 3552228 | 5th January 1971 | Shrode |
| 3550468 | 29th December 1970 | Pringle |
| 3550456 | 29th December 1970 | Pringle |
| 3474686 | 28th October 1969 | Liedel |
| 3472095 | 14th October 1969 | Kostin |
| 3468186 | 23rd September 1969 | McIntyre |
| 3456524 | 22nd July 1969 | Draplin |
| 3444755 | 20th May 1969 | Smith |

In order that the invention may be clearly understood and readily put into practical effect, there shall now be described preferred embodiments incorporating the features of the present invention, the description being by way of non-limitative example only and with reference to the accompanying illustrative drawings. In the drawings:

FIG. 1 is a perspective view of a drive unit and a mirror of the present invention;

FIG. 2 is a vertical corss-section along the lines of and in the direction of arrows 2—2 of FIG. 1;

FIG. 3 is a full horizontal cross-section along the lines of and in the direction of arrows 3—3 of FIG. 2;

FIG. 4 is a perspective view of the backing plate of FIGS. 2 and 3;

FIG. 5 is a perspective view of the nipple lock of FIGS. 2 and 3;

FIG. 6 is a perspective view of the antirotation disc of FIGS. 2 and 3;

FIG. 11 is a perspective view of a drive unit of the present invention;

FIG. 12 is a horizontal cross-section along the lines of and in the direction of arrows 12—12 of FIG. 11;

FIG. 13 is a full vertical cross-section along the lines of and in the direction of arrows 13—13 of FIG. 12;

FIG. 14 is a full vertical cross-section along the lines of and in the direction of arrows 14—14 of FIG. 12;

FIG. 15 shows a modification of FIG. 14;

FIG. 16 is a horizontal cross-section of a second form of compensator;

FIG. 17 is a horizontal cross-section of part of a third form of compensator;

FIG. 18 is a horizontal cross-section of part of a fourth form of compensator;

FIG. 19 is a side elevation of a modification of the drums of the drive unit;

FIGS. 20 to 23 are schematic views illustrating the operation of the drive unit of FIGS. 11 to 15;

Figure 7:
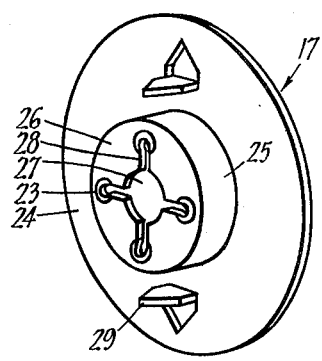
FIG. 7 is a perspective view of the cable end block of FIGS. 2 and 3.
Figure 8:
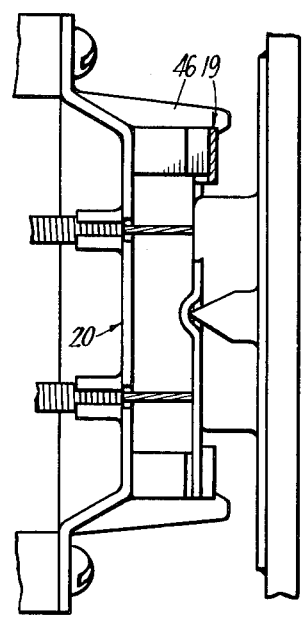
FIG. 8 is a vertical cross-section of a second embodiment of a mirror.

To refer to FIG. 1 there is shown a drive unit 10 for controlling the movement of a mirror 11. The mirror 11 is mounted within a housing 12 which in turn is mounted on a base 13. The drive unit 10 controls the operation of the mirror 11 by means of cables 14 via a tension compensator 15.

Referring now to FIGS. 2 to 10 where the mirror portion is shown in detail, the mirror 11 is mounted in a mounting plate 16. The mounting plate 16 may be of any suitable nature such as, for example, aluminium with the mirror 11 being held in place by an adhesive or a rolled rim, or may be a plastics material with the mirror 11 being held in place by an adhesive or by leaving the plate 16 moulded therearound.

Securely attached to the rear face of mounting plate 16 is a cable end block 17 which is approximately "hat" shaped. By this it is meant that it has an annular portion 24 with a co-axial cylindrical portion 25 which has an end wall 26 (see FIG. 7). The end wall 26 has a central aperture 27 of predetermined size and four mutually perpendicular slots 28 which have recessed portions 23 at their radially outermost end. Extending rearwardly and pressed from the annular portion 17 are two diametrally opposed pivot pins 29, the function of which will be described below.

Coaxial with the cable end block 17 is a nipple lock 18. The nipple lock 18 is elongate in shape and has recesses 30 at each end of body portion 31 thereof. Centrally and forwardly extending from the body 31 is a head portion 32 having a necked portion 32'. The head portion 32 is adapted to be a snap-fit through the aperture 27 of end wall 26 with the wall 26 engaging neck portion 32'. A doubly tapered aperture 33 passes coaxially through the body and head portions 31 and 32 (See FIG. 3) and two diametrally opposed holes 34 are provided through body portion 31. The "radial" distance of the holes 34 from the central axis of the nipple lock 18 is substantially equal to the radial distance of recesses 23 from the central axis of wall 26.

Mounted between the cable end block 17 and nipple lock 18 is an anti-rotation washer 19. The washer 19 is of an external diameter similar to the height of nipple lock 18 and has a radial extent similar to the height of the recesses 30. The washer 19 is provided with two diametrally opposed rearwardly extending indentations 35 and, at a rotation of 90°, two diametrally opposed forwardly extending indentations 36. The indentations 35 rest in recesses 30 when the apparatus is assembled.

The apparatus is assembled to the housing 12 by means of a backing plate 20. The plate 20 has a somewhat diamond shaped top 37, with two rearwardly and outwardly extending L shaped mounts 38 having holes 39 therein. The top 37 has four slots 40 therein for the reception of the cables, the undersurface of the top 37 having slotted cable end bosses 41. Mounted on and extending forwardly from the top are two pivot pins 42 which one equidistant from a tapered central pin 43. The plate 20 is attached to the housing 12 by means of stems 44 and bolts 45, or by any other suitable means.

The apparatus is assembled by placing the ends of the four cables 14 in each of the cable end bosses 41, with the ends of the inner cables 21 passing through the slots 40. The two cable ends which are to control the vertical directions of movement of mirror 11 are passed through holes 34 in nipple lock 18 whilst the other two — which control the horizontal movements of mirror 11 — pass through the central opening of anti-rotation washer 19. The four cable ends 21 are then passed through aperture 27 and are moved along slots 28, the correct cable end 21 being located in the correct slot 28. The nipple lock 18 with the anti-rotation wahser 19 mounted therein is then snapped into place in the aperture 27 to retain the cables in slots 28. The cables are prevented from further movement due to nipples 22 at their outer end, the nipples 22 being of a greater diameter than the width of slots 28.

When the nipple lock 18 is snapped into place in the aperture 27, the two pivot pins 29 are located in indentations 35 of the anti-rotation wahser 19.

The assembled components are then assembled with backing plate 20 by placing the nipple lock 18 over the end of tapered pin 43. The cables 14, 21 are then tensioned to maintain the completed assembly in the assembled state. When the final assembly takes place, pivot pins 42 are located in the indentations 36 of the anti-rotation washer 19.

Therefore, the mirror 11 can move about the vertical axis joining the two pins 29 and can independently move about the hirozontal axis joining the two pins 42. Any combination of those two movements is allowable due to the tapering nature of aperture 33.

Thus, by providing a rearwardly directed tension to any one cable 21, or any combination of two adjacent cables 21, the mirror 11 can be caused to move.

The pin 43 and nipple lock 18 are, basically, provided so as to prevent movement of the various components relative to each other in a radial direction. This may also be overcome by the embodiment shown in FIG. 8. Here there are provided two forwardly extending clips 46 attached to base plate 20. The clips 46 engage the anti-rotation washer 19 adjacent the indentations 35. In this way the assembled apparatus is prevented from relative radial movement and therefore the pin 43 and nipple lock 18 could be deleted.

Figure 9:
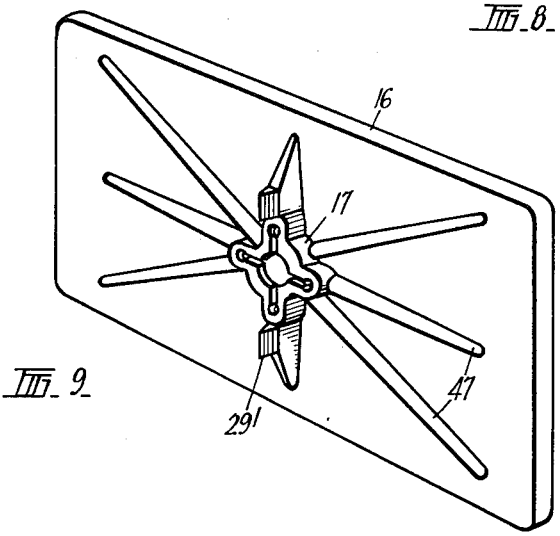
FIG. 9 is a perspective view of an alternative for the mounting of the mirror.

FIG. 9 shows a further variation wherein the cable end block 17 is made integral with the mounting plate 16. In this construction there would not be an annular portion 24 and hence the pins 29' would be outstanding from the plate 16. Strengthening ribs 47 could be provided if desired.

Figure 10:
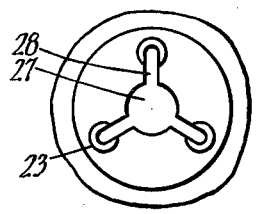
FIG. 10 is a part view of a variation of FIG. 9.

FIG. 10 shows a variation wherein the mirror can be adapted to a three cable operation. Here, there would be only three slots 28 at 120° spacing instead of 90° spacing. There would also be no need for holes 34 in nipple lock 18 (if used) and there would only be three slots 40 and cable end bosses 41. The use of the four pivot pins and four indentations in the anti-rotation washer would be retained to allow for proper movement of the mirror 11.

To refer now to FIGS. 11 to 14, there is shown a combination of drive unit 10 and compensation 15. The combination is contained within a substantially cylindrical housing 50 comprising a first part 51 and a second part 52. Part 51 has an internal wall 59 having in internal blind bore hole 57 therein and part 52 has an internal wall with an external blind bore hole 55 therein. When the parts 51 and 52 are assembled to form housing 50, walls 58 and 59 combine to form a complete internal wall 60, with holes 55 and 57 being co-axial. Hole 57 is preferably screw threaded so that a bolt 56 may be used to retain the parts 51 and 52 in assembled relationship. Housing part 52 is provided with a hollow cylindrical projection 53 which has an external screw thread 54 to enable the unit to be mounted in place in the dashboard or door of an automobile or the like.

The drive unit 10 basically comprises two drums mounted for individual rotation by the one controller. This is done by providing a first drum 61 mounted for roation on a stub-axle 62 on part 52 and a second drum 63 mounted for rotation on a stub-axle 64 on part 51, the stub axles 62, 64 being off-set vertically and horizontally, preferably such that the distance between the axis of the stub axles 62, 64 is no greater than the radius of the drums 61, 63. The first drum 61 is provided with a hole 65 therethrough vertically offset from axle 62 and the second drum 63 is provided with a recess 66 therein horizontally offset from its axle 64.

An operating lever 67 passes through a tapered opening 68 in part 52, through the hole 65 in the first drum 61 and into the recess 66 in the second drum 63. Where the lever 67 passes through the first drum 61 it is provided with an approximately spherical knob 69, a similar knob 70 being provided at the inner end 71 of the lever 67 in the recess 66. The hole 65 in the first drum is tapered radially inwardly towards the interior of the drum 61 with the narrowest point 72 of the hole 65 being located approximately two-thirds of the way along the hole 65 nearer the part 52 of the housing 50. The purpose of the narrowing of the diameter of the hole 65 is to retain the lever 67 in position. So as to assist this and to prevent rattles, there is preferably provided a small compression spring 73 in the recess 66 in the second drum 63 acting upon the end knob 70. This forces the middle knob 69 against the narrow portion 72 of the hole 65.

Thus, movement of the outer end of the lever 67 in the vertical direction will cause the inner end 71 to move in the opposite vertical direction - the lever pivoting about the middle knob 69. This movement of the inner end 71 causes the second drum 63 to rotate due to the lever 67 being mounted therein horizontally off-centre. The first drum 61 would not rotate as the middle knob 69 is arranged on the vertical transverse axis of that drum. Conversely, upon the outer end of the lever 67 being moved in the horizontal direction, the inner end 71 will not move due to it being mounted horizontally-but-not-vertically offset in the second drum 63, but as the lever 67 is mounted in the first drum 61 vertically-but-not-horizontally offset then the lever 67 will pivot about the end knob 70 and cause the first drum 61 to rotate.

Naturally, movement of the outer end of the lever 67 in a direction that has vertical and horizontal components would cause the two drums 61, 63 to rotate accordingly.

The two drums have secured thereto the inner cables 74 of the drive cables 14 with the two cables controlling movement about the same axis being mounted about the same drum. The ends of such inner cables 74 are joined to form a continuous loop.

So as to prevent slippage of the cables 74 relative to the drums, screws 75 are provided. Also, the drums may be non-cylindrical (as in FIGS. 13 to 15) and/or the cables 74 may be passed around the drums for half a turn (FIG. 13), almost a full turn (FIGS. 14 and 15), or for a number of turns. So as to allow the cables 74 access to the drums 61, 63, holes 76 are provided in wall 60. These holes 76 may be relatively straight (FIG. 13) curved (FIG. 14) or tapered (FIG. 15), the nature of the holes 76 being determined by the shapes of the drums 61, 63 and the method of securing the cables 74 to the drums 61, 63.

At the end of the housing 50 remote from the drums 61, 63 there are provided an anchoring and compensating device 15. The device consists of two hollow rectangular box-like mounting blocks 78 arranged side-by-side, one block 78 for each pair of cables 14. The blocks 78 are mounted within the housing 50 for movement in the axial direction only. The blocks 78 have stopped holes 79 therethrough to allow the passage therethrough of inner cables 74 whilst retaining cables 14 and preventing relative movement between the cables 14 and the blocks 78.

Passing through each block 78 and pressing against interior wall 60 is an adjusting bolt 80 which is arranged parallel to the longitudinal axis of the block 78 and between the holes 79. The bolt 80 passes through holes 81 in the inner end wall 83 and outer end wall 84 of the block 78. Mounted on the bolt 80 in the hollow interior of the block 78 is a nut 82 which is so dimensioned that it cannot rotate or turn relative to the block 78. Mounted on the bolt 80 between the nut 82 and the end wall 84 is a compression spring 85. Thus, rotation of the bolt 80 would cause the nut 82 to move relative to the bolt 80 and would thus move the mounting block 78. This would move the ends of cables 14 and would thus adjust the tensions in the cable.

Therefore, on installation of the device, the bolts 80 only need be rotated a few turns so as to adjust the cable tension to a level satisfactory for normal operation. The bolts 80 could also be rotated to allow for shrinkage or stretch of the cables.

Furthermore, if the cables were jammed, cramped, bent, or otherwise so as to cause a large increase in cable tension, the blocks 78 would move relative to the bolt 80 against the action of spring 85 so that spring 85 absorbed the increased cable tension and would thus allow normal operation of the drive unit and the mirror.

FIGS. 16 to 18 show a variation where there is provided a shaft 86 passing through each of the blocks 78', there being no nut 72. Furthermore, the hole in end wall 83' is enlarged so as to allow the passage therethrough of a second compression spring 87.

The spring 87 has a much softer tension than spring 85' and acts to absorb minor variations in cable tension such as, for example, cable stretch or shrinkage or variations in cable length or tension on installation. Thus, it acts in much the same way as bolt 80 and nut 82.

Mounted on shaft 86 is an annular washer 88 of internal diameter slightly greater than the diameter of shaft 86. Thus, when the washer 88 assumes the position shown in FIGS. 16 to 18, it jams on the shaft 86. So as to facilitate this jamming, the last coil 89 of spring 85' is bent or deformed to the desired angle. Thus, if the cables are jammed, cramped, bent, or otherwise so as to cause an increase in cable tension and a user attempted to operate the drive unit, then the block 78' would move until the spring 85' become virtically coil-bound whereupon coil 89 would straighten — allowing the washer 88 to also straighten. Thus, the spring 85' would move the washer 88 against the action of softer spring 87 and would therefore absorb the increased cable tension and would allow normal operation of the drive unit and mirror.

In FIG. 17, there is shown a sleeve 90 mounted on shaft 86. The function of sleeve 90 is to cause the coil 89 of spring 85' to straighten before that spring becomes coil-bound. This would allow for earlier operation of the compensator. This is varied in FIG. 18 where there is provided a projection 91 to perform the same function as sleeve 90.

The compensator 15 may be changed by having only one block 78 if desired and/or only one bolt 80 or shaft 86. The compensator 15 may be adapted for three or even two cable operation by reduction of the number of holes 79.

FIG. 19 shows a differing means for securing the cables 74 to the drums. There, the ends of the cables 74 are formed into small loops 93 which engage behind notches 92 in the drums.

FIGS. 20 to 23 show the operation of the drive unit 10. In FIGS. 20 and 21, the control lever 67 has not been moved and hence the mirror 11 is in a "neutral" position. The cables 14 attached to drum 63 are vertically arranged on the mirror 11 and thus control movement of the mirror 11 about the horizontal axis, whilst the cables attached to drum 61 are horizontally arranged on the mirror 11 and thus control movement of the mirror 11 about the vertical axis.

Upon the outer end of lever 67 being moved horizontally to the left (FIG. 22), drum 63 will not rotate as the lever 67 is attached thereto on its horizontal axis. However, as the lever 67 is attached to drum 61 on its vertical axis, the drum 61 will rotate in an anticlockwise direction. This will cause the upper of the two cables 14 attached to the drum 61 to shorten and the lower of the two to lengthen. Thus, the mirror 11 will move about its vertical axis to move forwardly to its left.

Upon the outer end of lever 67 being moved vertically downwardly (FIG. 23), drum 61 will not rotate as the lever 67 is attached thereto on its vertical axis. However, as the lever 67 is attached to drum 63 will rotate in a clockwise direction. This will cause the upper of the two cables 14 attached to drum 63 to kengthen and the lower to shorten. Thus, the mirror will move about its horizontal axis to move downwardly.

Figure 24:
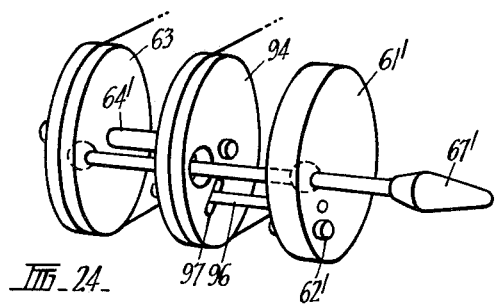
FIG. 24 is a schematic perspective view of a second form of drive unit.

In FIG. 24 there is shown a second embodiment of the drive unit of the invention. Here, the drum 63 is as before but drum 61' is changed from previously described drum 61, and a third drum 94 is added. The three drums 63, 94 and 61' are concentrically arranged.

The arrangement is that drum 63 is mounted for rotation on axle 64', as is drum 94. The drums 63 and 94 have substantially the same diameter and they both rotate about their central axis. Drum 63 drives the cables for the horizontal movement of the mirror and drum 94 drives the cables for the vertical movement of the mirror. Drum 61' does not drive cables directly. drum 63 is driven and operates as is described above.

Drum 61' is mounted for rotation on a stub-axle 62' and operates as before. However, drum 61' has extending outwardly therefrom a pin 96 mounted radially inwardly of stub-axle 62'. The pin 96 extends to and engages in a radially directed slot 97 in drum 94 the width of the slot 97 being the same as the diameter of the pin 96. The slot 98 is located below and between axle 64' and a hole 98 through drum 94 to allow the clear passage therethrough of the operating lever 67'.

The operating lever 67' is operatively connected to drums 63 and 61' in the manner described above.

Figure 25:
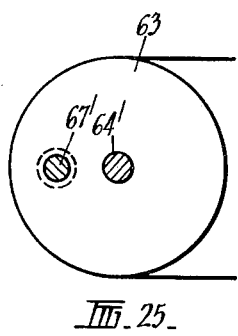
FIGS. 25 to 33 are side views of the three drums of FIG. 24 illustrating the operation of the second form of drive unit.
Figure 26:
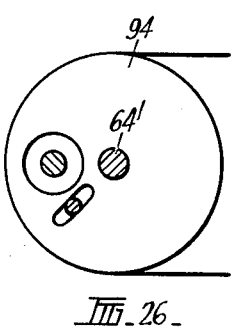
Figure 27:
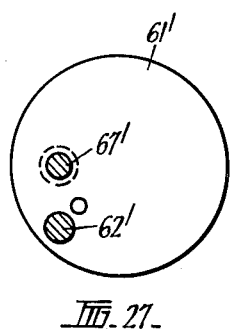
Figure 28:
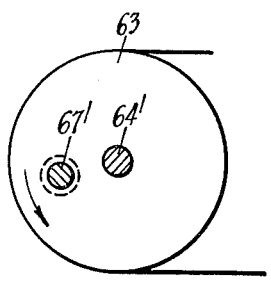
Figure 29:
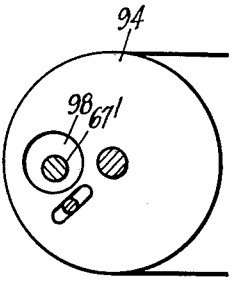
Figure 30:
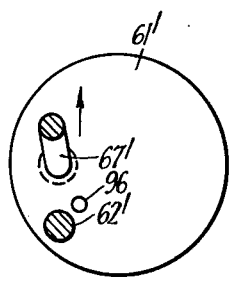
Figure 31:
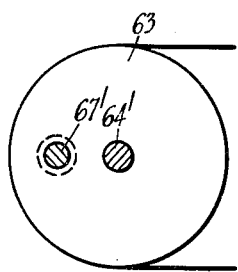
Figure 32:
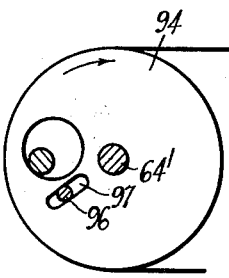
Figure 33:
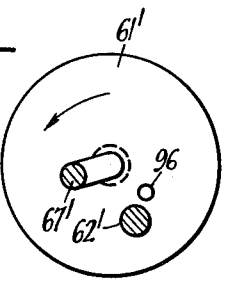

FIGS. 25 to 33 show the operation of the embodiment of FIG. 24 with FIGS. 25, 28 and 31 showing drum 63, FIGS. 26, 29 and 32 showing drum 94, and FIGS. 27 30 and 33 showing drum 61'.

When lever 67' is in the "neutral" position then the three drums are as shown in FIGS. 25, 26 and 27.

When the outer end of lever 67' is moved vertically upwardly as in FIGS. 28, 29 and 30, drum 61' will not rotate due to the vertical alignment of lever 67' and axle 62'. Drum 94 will not rotate as lever 67' does not operatively connect therewith. Drum 63 will rotate in the anticlockwise direction due to lever 67' operatively connecting therewith in horizontal off-set relationship relative to axle 64'.

When the outer end of lever 67' is moved horizontally to the left as in FIGS. 31, 32, drum 63 will not rotate due to the horizontal alignment of lever 67' and axle 64'. Drum 61' will however, rotate about axle 62' to cause pin 96 to move in an arcuate fashion. Pin 26 will therefore act against the sides of groove 97 in drum 94 to cause that drum to rotate about axle 64' and to thus operate the mirror.

The above described drive units may be varied for three cable operation by replacing one cable by a small tension spring. They may also be adapted for two cable operation by replacing the lower or upper cables by small tension springs.

In the above, it is to be realized that cables of any suitable nature may be used but the cables are preferably of the Bowden type which can act as push and/or pull cables.

Whilst there has been described in the foregoing description preferred embodiments of the present invention, it will be understood by those skilled in the art that many variations in details of design or construction may be made without departing from the invention, the ambit of which is to be determined from the following claims.

I claim:

1. A compensator for Bowden cables comprising
   a housing having a hollow interior;
   a block mounted in the hollow interior of the housing for movement relative to the housing in an axial direction only and being adapted to retain therein the outer sheath of a cable;
   shaft means passing through the block in the axial direction and acting on an inner end wall of the housing;
   a first compression spring mounted on the shaft inside the block;
   a retaining device located on said shaft in a position that is adjustable with respect to said housing for holding said first compression spring against unwanted axial movement relative to the shaft; and
   a primary adjusting means mounted on said shaft to provide for adjustment to allow for variations in cable length and size;
   said first compression spring and said retaining device cooperating, in a condition of low cable tension, to bias the block in an outward direction and, in a condition of high cable tension, to allow the block to compress the spring to compensate for that high cable tension.

2. A compensator as claimed in claim 1, wherein the primary adjusting means comprises a second compression spring mounted on the shaft and acting on the interior wall and the retaining device.

3. A compensator as claimed in claim 2, wherein the retaining device comprises an annular washer mounted on the shaft and arranged to jam thereon when its axis is not parallel to the longitudinal axis of the shaft, the first compression spring having an offset coil adjacent the washer to retain the washer at an angled position except when substantially coil-bound.

4. A compensator as claimed in claim 3, wherein there is provided a sleeve on the shaft to move the washer to the parallel position before the first compression spring becomes coil-bound.

5. A compensator as claimed in claim 3, wherein there is provided a projection on said block to move the washer to the parallel position before the first compression spring becomes coil-bound.

6. A compensator as claimed in claim 1, wherein the shaft is screw threaded along a substantial portion of its length; the retaining device comprises a nut mounted on the shaft for screwing engagement with the shaft and being held against rotation relative to the block; the nut and screw-threaded shaft comprising the primary adjusting means.

* * * * *